(12) United States Patent
Munoz et al.

(10) Patent No.: US 12,367,141 B2
(45) Date of Patent: Jul. 22, 2025

(54) RUNNING AVERAGE CACHE HIT RATE

(71) Applicant: Advanced Micro Devices, Inc., Santa Clara, CA (US)

(72) Inventors: Edgar Munoz, Austin, TX (US); Chintan S. Patel, Austin, TX (US); Gregg Donley, Santa Clara, CA (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/345,974

(22) Filed: Jun. 30, 2023

(65) Prior Publication Data

US 2025/0004943 A1  Jan. 2, 2025

(51) Int. Cl.
*G06F 12/08*  (2016.01)
*G06F 12/0802*  (2016.01)

(52) U.S. Cl.
CPC .... *G06F 12/0802* (2013.01); *G06F 2212/604* (2013.01)

(58) Field of Classification Search
CPC ................. G06F 12/08; G06F 12/0802; G06F 2212/604; G06F 12/02
See application file for complete search history.

(56) References Cited

U.S. PATENT DOCUMENTS

| | | | |
|---|---|---|---|
| 8,490,101 B1 | 7/2013 | Small et al. | |
| 10,409,729 B1* | 9/2019 | Naamad | G06F 11/3409 |
| 2007/0005889 A1 | 1/2007 | Matthews | |
| 2013/0138889 A1* | 5/2013 | Chockler | G06F 11/3466 |
| | | | 711/E12.041 |
| 2013/0151777 A1* | 6/2013 | Daly | G06F 12/0888 |
| | | | 711/E12.024 |

(Continued)

FOREIGN PATENT DOCUMENTS

| | | | |
|---|---|---|---|
| CN | 114968846 A | 8/2022 | |
| EP | 3101549 A1 * | 12/2016 | ......... G06F 12/0871 |

(Continued)

OTHER PUBLICATIONS

Beckmann et al., "LHD: Improving Cache Hit Rate by Maximizing Hit Density," https//www.usenix.org/conference/nsdi18/presentation/Beckmann, Proceedings of the 15.SUP.th .USENIX Symposium on Networked Systems Design and Implementation, Renton, WA, Apr. 9-11, 2018, 16 pages.*

(Continued)

*Primary Examiner* — Pierre Michel Bataille
(74) *Attorney, Agent, or Firm* — Greenberg Traurig, LLP

(57) ABSTRACT

The disclosed device includes a first register that stores a cumulative delta value and a second register that stores an average cache hit rate. The device also includes a control circuit that calculates a cache hit rate and updates the cumulative delta value based on the cache hit rate and the average cache hit rate. The control circuit also updates the average cache hit rate based on the updated cumulative delta value, and can update a cache allocation policy based on the updated average cache hit rate. Various other methods, systems, and computer-readable media are also disclosed.

20 Claims, 4 Drawing Sheets

(56) References Cited

U.S. PATENT DOCUMENTS

| | | | | |
|---|---|---|---|---|
| 2013/0151780 A1* | 6/2013 | Daly | ............. | G06F 12/122 |
| | | | | 711/E12.024 |
| 2014/0149678 A1* | 5/2014 | Chaudhary | ......... | G06F 12/0862 |
| | | | | 711/137 |
| 2017/0068618 A1* | 3/2017 | Akiyama | ............ | G06F 12/0871 |
| 2017/0206164 A1* | 7/2017 | Choi | ................. | G06F 12/0871 |
| 2019/0065375 A1* | 2/2019 | Al Sheikh | ........... | G06F 12/1063 |
| 2021/0157725 A1* | 5/2021 | Barbalho | ........... | G06F 12/0802 |
| 2024/0004555 A1* | 1/2024 | Fukutomi | ........... | G06F 12/0238 |
| 2024/0028510 A1* | 1/2024 | Arelakis | ............. | G06F 12/0811 |
| 2024/0078178 A1* | 3/2024 | Durbhakula | ........ | G06F 12/0802 |

FOREIGN PATENT DOCUMENTS

| | | | | |
|---|---|---|---|---|
| EP | 3101549 B1 | | 9/2018 | |
| EP | 4035015 B1 * | | 5/2024 | ......... G06F 12/0811 |
| WO | 2013162614 A1 | | 10/2013 | |
| WO | WO-2016097807 A1 * | | 6/2016 | ............. G06F 12/08 |
| WO | WO-2016165542 A1 * | | 10/2016 | ............. G06F 12/02 |
| WO | WO-2023000696 A1 * | | 1/2023 | ......... G06F 12/0871 |

OTHER PUBLICATIONS

M. K. Qureshi, D. N. Lynch, O. Mutlu and Y. N. Patt, "A Case for MLP-Aware Cache Replacement," 33rd International Symposium on Computer Architecture (ISCA'06), Boston, MA, USA, 2006, pp. 167-178.*

T. Zong, C. Li, Y. Lei, G. Li, H. Cao and Y. Liu, "Cocktail Edge Caching: Ride Dynamic Trends of Content Popularity With Ensemble Learning," in IEEE/ACM Transactions on Networking, vol. 31, No. 1, pp. 208-219, Feb. 2023.*

J.-H. Choi and G.-H. Park, "NVM Way Allocation Scheme to Reduce NVM Writes for Hybrid Cache Architecture in Chip-Multiprocessors," in IEEE Transactions on Parallel and Distributed Systems, vol. 28, No. 10, pp. 2896-2910, Oct. 1, 2017.*

International Search Report and Written Opinion in PCT Application No. PCT/US2024/035910 mailed Oct. 17, 2024, By: Authorized Officer: Jeong Rok Yang.

* cited by examiner

RUNNING AVERAGE CACHE HIT RATE

BACKGROUND

Managing a cache involves managing cache allocation policies (e.g., reserving portions of the cache) to improve performance. Cache thrashing (e.g., continuous cache misses which require reading from memory) reduces performance and is a factor for determining cache allocation policies. Detecting cache thrashing involves tracking a running average cache hit rate, which further involves tracking a history of cache hit rates. However, tracking this history of cache hit rates can require sufficient processor storage, which can be expensive.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
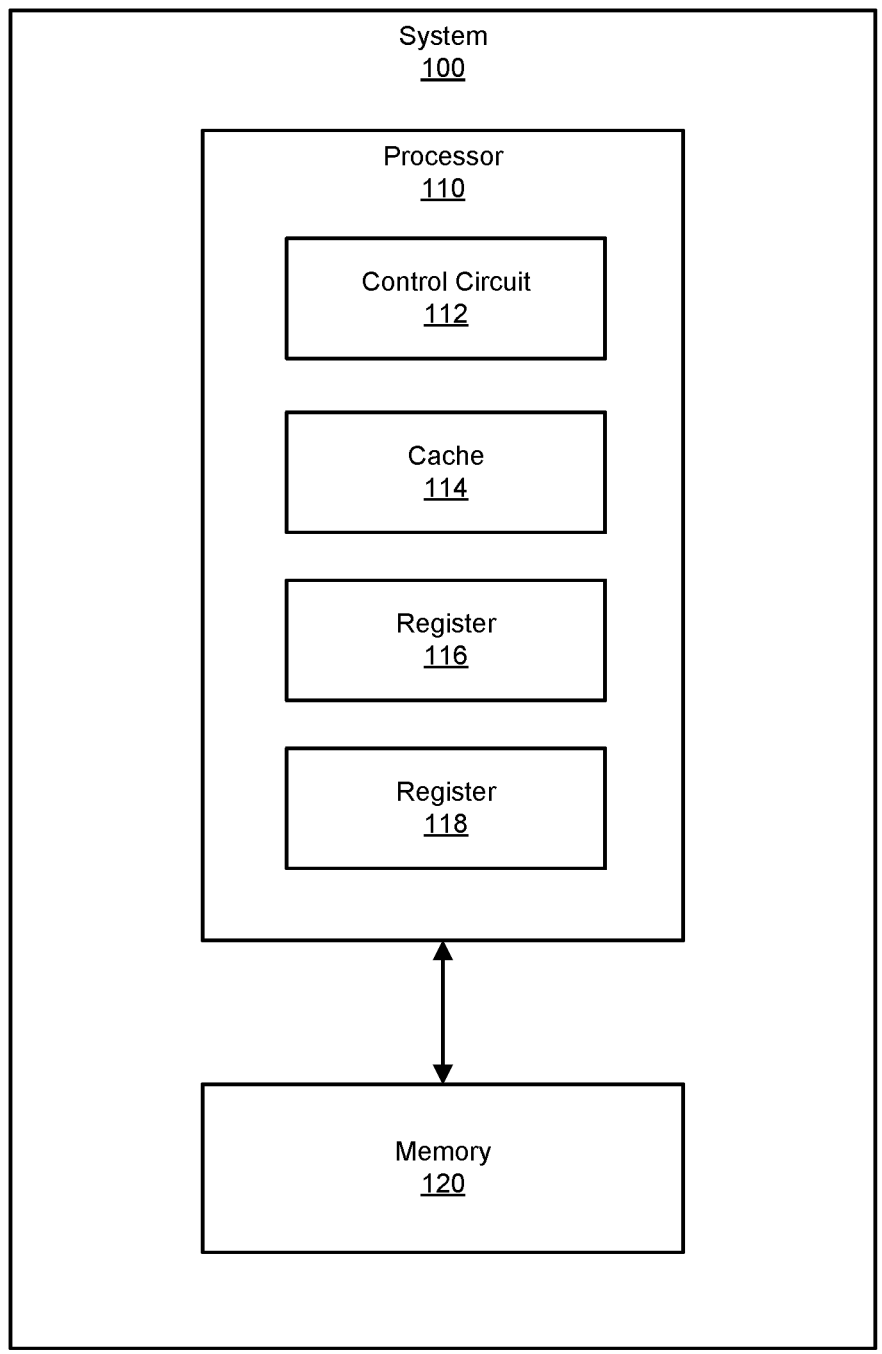
FIG. 1 is a block diagram of an exemplary system for a running average cache hit rate.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a running average cache hit rate that can be implemented without the need to track a history of cache hit rates. As will be explained in greater detail below, implementations of the present disclosure track a cumulative delta value from a current cache hit and an average cache hit rate, and update the average cache hit rate based on the delta. A cache allocation policy can be updated from the updated average cache hit rate.

In one implementation, a device for maintaining a running average cache hit rate includes a first register configured to store a cumulative delta value, a second register configured to store an average cache hit rate, and a control circuit. The control circuit can be configured to (i) calculate a cache hit rate, (ii) update the cumulative delta value based on the cache hit rate and the average cache hit rate, (iii) update the average cache hit rate based on the updated cumulative delta value, and (iv) update a cache allocation policy based on the updated average cache hit rate.

In some examples, the control circuit is configured to update the cumulative delta value by determining a difference between the cache hit rate and the average cache hit rate, and adding the difference to the cumulative delta value.

In some examples, the control circuit is configured to update the average cache hit rate based on determining that the updated cumulative delta value exceeds a delta range. In some examples, the control circuit is configured to determine that the updated cumulative delta value exceeds the delta range by determining that the updated cumulative delta value exceeds an upper delta threshold. In some examples, the control circuit is configured to update the average cache hit rate by incrementing the average cache hit rate in response to the updated cumulative delta value exceeding the upper delta threshold. In some examples, the control circuit is configured to increment the average cache hit rate using an increment factor. In some examples, the increment factor is based on a magnitude of the updated cumulative delta value exceeding the upper delta threshold.

In some examples, the control circuit is configured to determine that the updated cumulative delta value exceeds the delta range by determining that the updated cumulative delta value is below a lower delta threshold. In some examples, the control circuit is configured to update the average cache hit rate by decrementing the average cache hit rate in response to the updated cumulative delta value being below the lower delta threshold. In some examples, the control circuit is configured to decrement the average cache hit rate using a decrement factor. In some examples, the decrement factor is based on a magnitude of the updated cumulative delta value being below the lower delta threshold.

In some examples, the control circuit is further configured to reset the cumulative delta value in response to updating the average cache hit rate. In some examples, the control circuit is configured to reset the cumulative delta value using the updated average cache hit rate.

In one implementation, a system for maintaining a running average cache hit rate includes a physical memory, at least one physical processor comprising a cache, a first register configured to store a cumulative delta value, a second register configured to store an average cache hit rate for the cache, and a control circuit. The control circuit can be configured to (i) calculate a cache hit rate for the cache, (ii) update, in the first register, the cumulative delta value based on the cache hit rate and the average cache hit rate, (iii) determine that the updated cumulative delta value exceeds a delta range, (iv) update, in response to determining that the updated cumulative delta value exceeds the delta range, the average cache hit rate in the second register, and (v) update a cache allocation policy for the cache based on the updated average cache hit rate.

In some examples, the control circuit is configured to update the cumulative delta value by determining a difference between the cache hit rate and the average cache hit rate, and adding the difference to the cumulative delta value.

In some examples, the control circuit is configured to determine that the updated cumulative delta value exceeds the delta range by determining that the updated cumulative delta value exceeds an upper delta threshold. In some examples, the control circuit is configured to update, in response to the updated cumulative delta value exceeding the upper delta threshold, the average cache hit rate by incrementing the average cache hit rate using an increment factor that is based on a magnitude of the updated cumulative delta value exceeding the upper delta threshold.

In some examples, the control circuit is configured to determine that the updated cumulative delta value exceeds the delta range by determining that the updated cumulative delta value is below a lower delta threshold. In some examples, the control circuit is configured to update, in response to the updated cumulative delta value being below the lower delta threshold, the average cache hit rate by decrementing the average cache hit rate using a decrement factor that is based on a magnitude of the updated cumulative delta value being below the lower delta threshold.

In some examples, the control circuit is further configured to reset the cumulative delta value using the updated average cache hit rate.

In one implementation, a method for maintaining a running average cache hit rate includes (i) calculating a cache hit rate for a cache, (ii) determining a difference between the cache hit rate and an average cache hit rate for the cache, (iii) updating a cumulative delta value by adding the difference to the cumulative delta value, (iv) determining that the updated cumulative delta value exceeds a delta range, (v) updating, in response to determining that the updated cumulative delta value exceeds the delta range, the average cache hit rate, (vi) resetting the cumulative delta value in response to updating the average cache hit rate, and (vii) updating a cache allocation policy for the cache based on the updated average cache hit rate.

In some examples, determining that the updated cumulative delta value exceeds the delta range includes determining that the updated cumulative delta value exceeds an upper delta threshold. In some examples, updating the average cache hit rate includes updating, in response to the updated cumulative delta value exceeding the upper delta threshold, the average cache hit rate by incrementing the average cache hit rate using an increment factor that is based on a magnitude of the updated cumulative delta value exceeding the upper delta threshold.

In some examples, determining that the updated cumulative delta value exceeds the delta range includes determining that the updated cumulative delta value exceeds the delta range by determining that the updated cumulative delta value is below a lower delta threshold. In some examples, updating the average cache hit rate includes updating, in response to the updated cumulative delta value being below the lower delta threshold, the average cache hit rate by decrementing the average cache hit rate using a decrement factor that is based on a magnitude of the updated cumulative delta value being below the lower delta threshold.

In some examples, resetting the cumulative delta value includes resetting the cumulative delta value using the updated average cache hit rate.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of managing a running average cache hit rate. Detailed descriptions of example systems will be provided in connection with FIG. 1. Detailed descriptions of a running average and delta will be provided in connection with FIG. 2. Detailed descriptions of corresponding methods will also be provided in connection with FIGS. 3 and 4.

FIG. 1 is a block diagram of an example system 100 for a running average cache hit rate. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a cache 114, a register 116, and a register 118. Control circuit 112 corresponds to one or more controllers includes circuitry and/or instructions for maintaining an average cache hit rate of cache 114, and in some examples can further correspond to or be coupled to a cache controller (e.g., for applying a cache allocation policy) for cache 114. Cache 114 corresponds to a local storage of processor 110 for processing data without incurring latency of accessing data from memory 120 and in some examples can correspond to multiple caches (e.g., a cache hierarchy). Register 116 and register 118 each correspond to memory elements for storing values in processor 110 and in some examples can store a cumulative delta value and/or the average cache hit rate as described herein.

In some examples, a cache allocation policy for cache 114 can determine whether to allocate to cache 114 or not. When cache 114 includes data needed by processor 110 such that accessing memory 120 can be avoided, setting the cache allocation policy to allocate (e.g., allocating or reserving a portion of cache 114) can be desirable so as not to evict the cached data. When cache 114 does not include data as needed by processor 110 such that processor 110 is accessing memory 120, setting the cache allocation policy to not allocate can be desirable in order to allow data to be cached. A cache hit rate (e.g., a rate or percent of cache hits or finding requested data in the cache) can indicate whether cache 114 tends to include the needed data. More specifically, a running average cache hit rate can indicate historical performance of cache 114 for determining the desired cache allocation policy.

The running average cache hit rate can be calculated by storing cache hit rates and averaging the cache hit rates. However, storing a sufficient number of cache hit rates can be prohibitive, for example requiring a large storage structure. The systems and methods described herein provide a running average cache hit rate that avoids storing historical cache hit rates.

Figure 2:
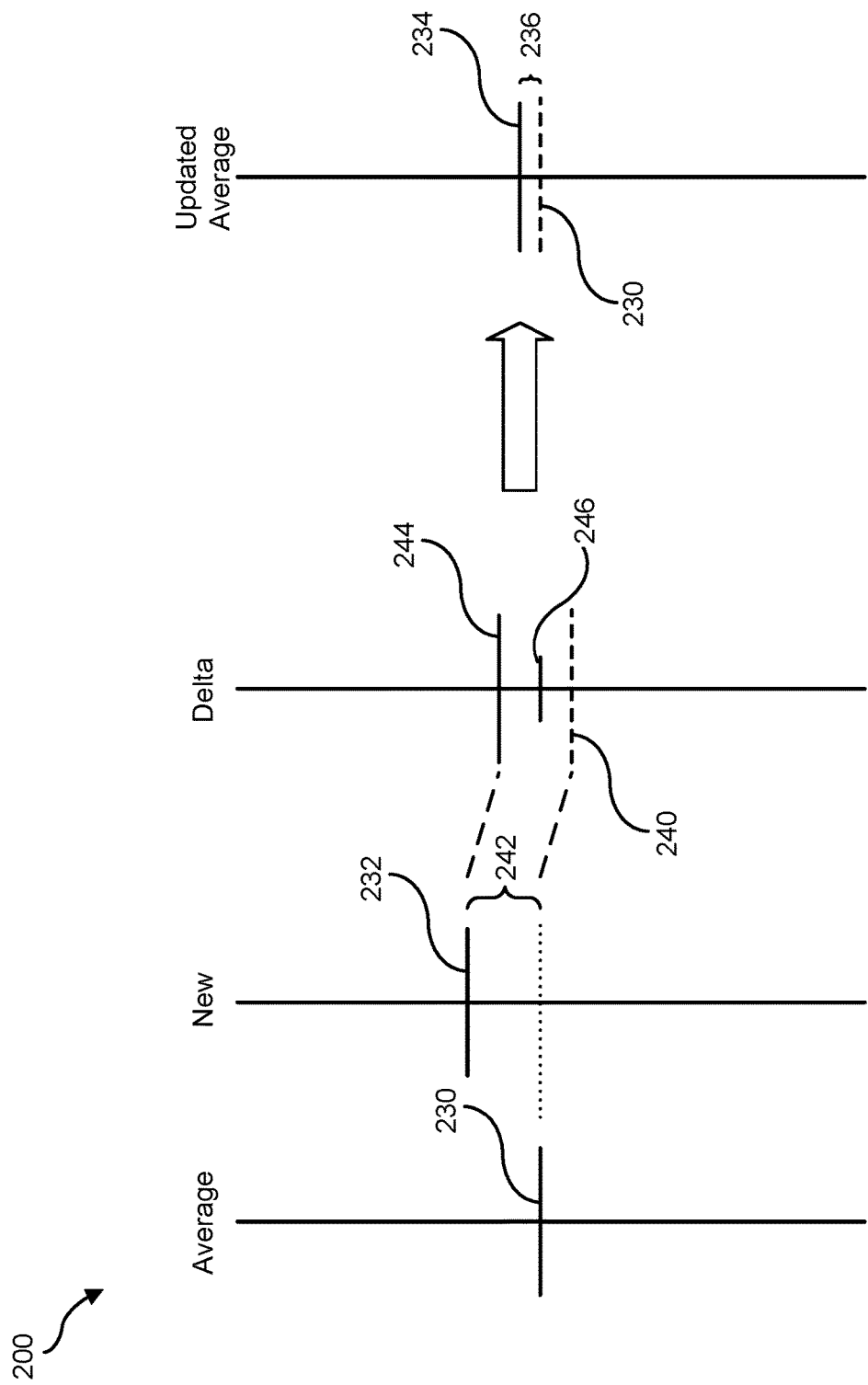
FIG. 2 is a diagram of a running average cache hit rate without a cache hit rate history.

FIG. 2 illustrates a diagram 200 for graphically representing a running average cache hit rate 230 (which can be stored in register 118) calculated using a cumulative delta value 240 (which can be stored in register 116). Control circuit 112 can calculate a new cache hit rate 232 (e.g., using a counter for counting cache hits over a predetermined number of cycles). A delta 242 corresponds to a difference between new cache hit rate 232 and running average cache hit rate 230. Although FIG. 2 illustrates delta 242 as positive (e.g., new cache hit rate 232 being greater than running average cache hit rate 230), in other implementations delta 242 can be zero or negative.

A cumulative delta value 240 can be updated with the difference between new cache hit rate 232 and running average cache hit rate 230 (e.g., delta 242) and stored (e.g., in register 116) as updated cumulative delta value 244.

Control circuit 112 can determine whether updated cumulative delta value 244 exceeds a delta range. For example, in FIG. 2, updated cumulative delta value 244 exceeds an upper delta threshold 246. In some examples, upper delta threshold 246 can correspond to running average cache hit rate 230 although in other examples upper delta threshold 246 can correspond to other values, such as a predetermined value, a value relative to (e.g., offset from and/or is a percentage of) running average cache hit rate 230, a configurable parameter, etc. In response, control circuit 112 can update running average cache hit rate 230. For instance, running average cache hit rate 230 can be updated, by adding an increment factor 236, to updated average cache hit rate 234, which can be stored in register 118. Increment factor 236 can, in some examples, be a predetermined value (e.g., 1), although in other examples can be based on a magnitude of updated cumulative delta value 244 exceeding upper delta threshold 246 (e.g., scaled by a factor), all of which can also be configurable parameters.

Although FIG. 2 illustrates updated cumulative delta value 244 exceeding upper delta threshold 246, in other examples, updated cumulative delta value 244 can be below a lower delta threshold. Similar to upper delta threshold 246, the lower delta threshold can be a predetermined value (e.g., 0), a value relative to running average cache hit rate 230, and/or a configurable parameter. Control circuit 112 can update running average cache hit rate 230 by decrementing running average cache hit rate 230 using a decrement factor that is, similar to increment factor 236, a predetermined value (e.g., −1), although in other examples can be based on a magnitude of updated cumulative delta value 244 being below the lower delta threshold, all of which can also be configurable parameters.

In some examples, after updating running average cache hit rate 230, control circuit 112 can reset updated cumulative delta value 244, for instance setting cumulative delta value 240 to a new value stored in register 116. For example, cumulative delta value 240 can be reset to a predetermined value (e.g., 0), a value relative to updated running average cache hit rate 234, a value relative to updated cumulative delta value 244, all of which can be configurable parameters.

Moreover, in response to updating the running average cache hit rate, control circuit 112 can accordingly update a cache allocation policy for cache 114 based on updated average cache hit rate 234.

Figure 3:
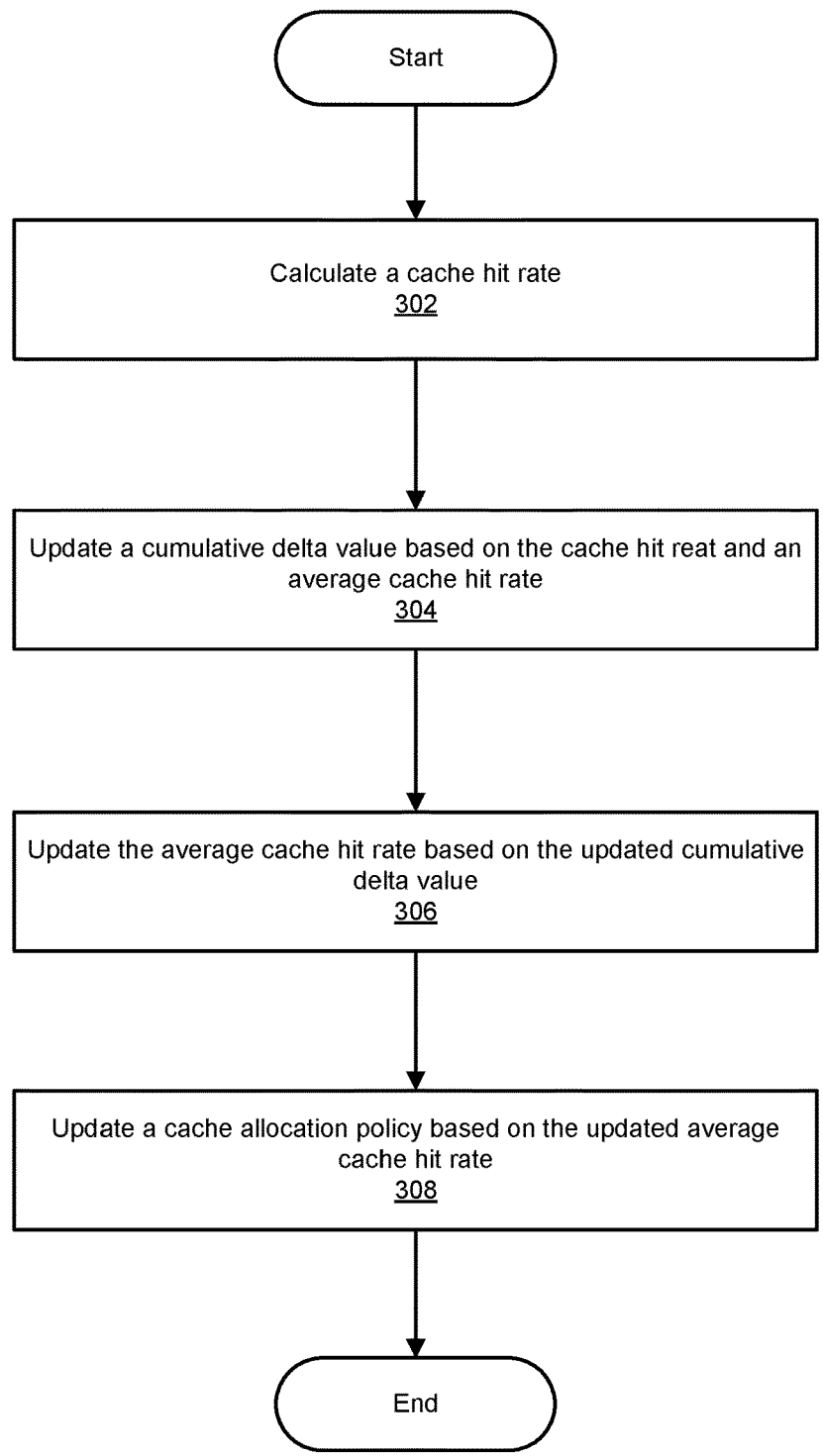
FIG. 3 is a flow diagram of an exemplary method for a running average cache hit rate.

FIG. 3 is a flow diagram of an exemplary computer-implemented method 300 for tracking a running average cache hit rate. The steps shown in FIG. 3 can be performed by any suitable circuit and/or computing system, including the system(s) illustrated in FIG. 1. In one example, each of the steps shown in FIG. 3 represent an algorithm whose structure includes and/or is represented by multiple sub-steps, examples of which will be provided in greater detail below.

As illustrated in FIG. 3, at step 302 one or more of the systems described herein calculate a cache hit rate. For example, control circuit 112 can calculate a new cache hit rate.

At step 304 one or more of the systems described herein update a cumulative delta value based on the cache hit rate and an average cache hit rate. For example, control circuit 112 can update a cumulative delta value stored in register 116 based on the new cache hit rate and an average cache hit rate stored in register 118.

The systems described herein can perform step 304 in a variety of ways. In one example, control circuit 112 can update the cumulative delta value by determining a difference between the cache hit rate and the average cache hit rate and adding the difference to the cumulative delta value, which can be stored in register 116.

At step 306 one or more of the systems described herein update the average cache hit rate based on the updated cumulative delta value. For example, control circuit 112 can update the average cache hit rate stored in register 118 based on the updated cumulative delta value stored in register 116.

The systems described herein can perform step 306 in a variety of ways. In one example, control circuit 112 can update the average cache hit rate based on determining that the updated cumulative delta value exceeds a delta range. For instance, control circuit 112 can determine that the updated cumulative delta value exceeds an upper delta threshold and accordingly update the average cache hit rate by incrementing the average cache hit rate in response to the updated cumulative delta value exceeding the upper delta threshold. Control circuit 112 can increment the average cache hit rate using an increment factor, which in some examples is based on a magnitude of the updated cumulative delta value exceeding the upper delta threshold.

In another example, control circuit 112 can determine that the updated cumulative delta value exceeds the delta range by determining that the updated cumulative delta value is below a lower delta threshold. Control circuit 112 can update the average cache hit rate by decrementing the average cache hit rate in response to the updated cumulative delta value being below the lower delta threshold. Control circuit 112 can decrement the average cache hit rate using a decrement factor, which in some examples is based on a magnitude of the updated cumulative delta value being below the lower delta threshold.

In some examples, control circuit 112 can reset the cumulative delta value in response to updating the average cache hit rate. In some examples, control circuit 112 can reset the cumulative delta value using the updated average cache hit rate.

At step 308 one or more of the systems described herein update a cache allocation policy based on the updated average cache hit rate. For example, control circuit 112 can update a cache allocation policy for cache 114 based on the updated average cache hit rate.

Figure 4:
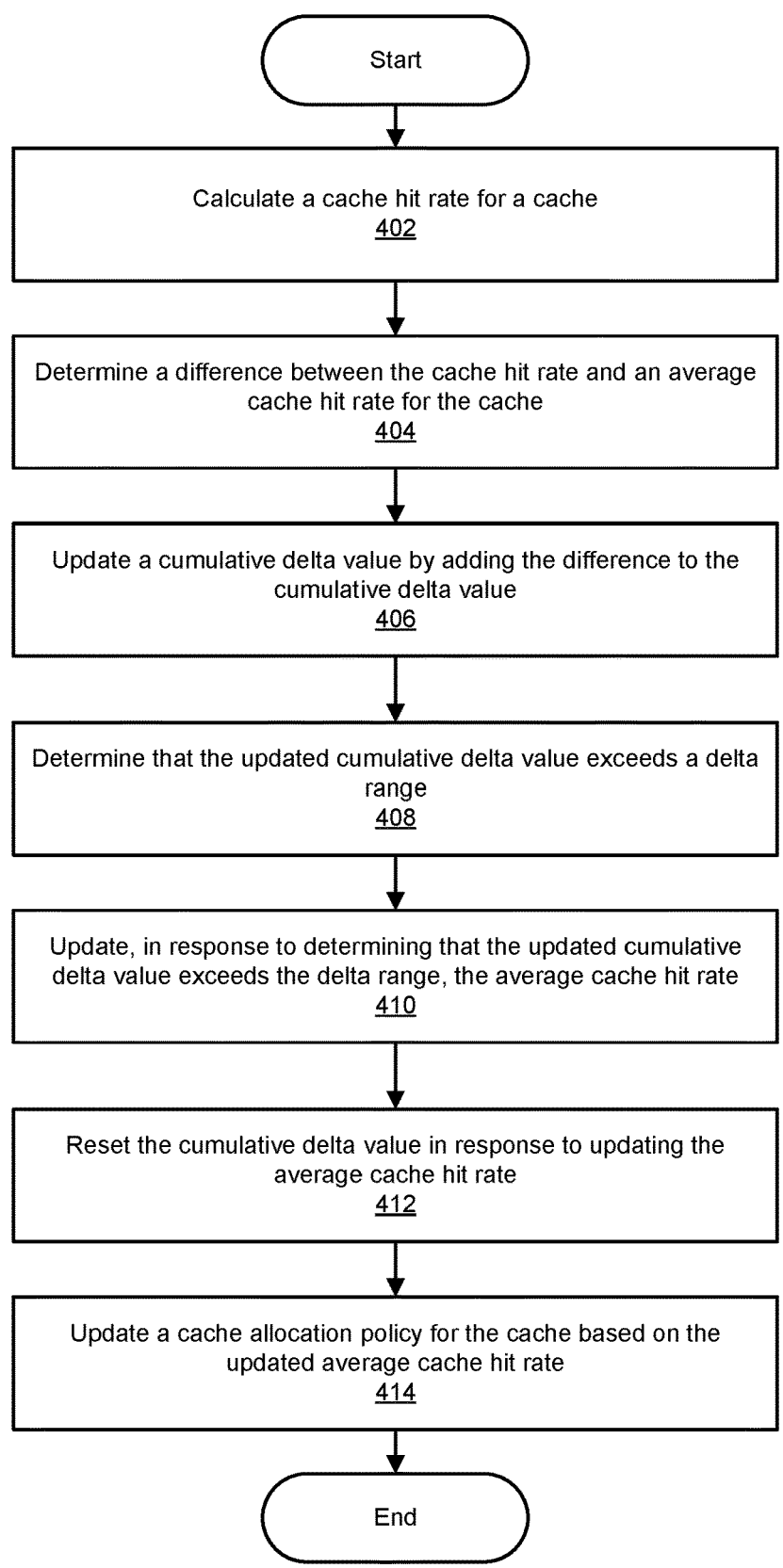
FIG. 4 is a flow diagram of another exemplary method for a running average cache hit rate.

FIG. 4 is a flow diagram of an exemplary computer-implemented method 400 for tracking a running average cache hit rate. The steps shown in FIG. 4 can be performed by any suitable circuit and/or computing system, including the system(s) illustrated in FIG. 1. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein calculate a cache hit rate for a cache. For example, control circuit 112 can calculate a new cache hit rate for cache 114.

At step 404 one or more of the systems described herein determine a difference between the cache hit rate and an average cache hit rate for the cache. For example, control circuit 112 can determine a difference between the new cache hit rate and an average cache hit rate for cache 114 stored in register 118.

At step 406 one or more of the systems described herein update a cumulative delta value by adding the difference to the cumulative delta value. For example, control circuit 112 can update a cumulative delta value stored in register 116 by adding the difference to the cumulative delta value.

At step 408 one or more of the systems described herein determine that the updated cumulative delta value exceeds a delta range. For example, control circuit 112 can determine that the update cumulative delta value stored in register 116 exceeds a delta range (e.g., is above an upper delta threshold or is below a lower delta threshold).

The systems described herein can perform step 408 in a variety of ways. In one example, determining that the updated cumulative delta value exceeds the delta range includes determining that the updated cumulative delta value exceeds an upper delta threshold (see, e.g., FIG. 2). In another example, determining that the updated cumulative delta value exceeds the delta range includes determining that the updated cumulative delta value exceeds the delta range by determining that the updated cumulative delta value is below a lower delta threshold.

At step 410 one or more of the systems described herein update, in response to determining that the updated cumulative delta value exceeds the delta range, the average cache hit rate. For example, control circuit 112 can update the average cache hit rate stored in register 118 in response to determining that the updated cumulative delta value stored in register 116 exceeds the delta range.

The systems described herein can perform step 410 in a variety of ways. In one example, updating the average cache hit rate includes updating, in response to the updated cumulative delta value exceeding the upper delta threshold, the average cache hit rate by incrementing the average cache hit rate using an increment factor (see, e.g., FIG. 2). In some examples, the increment factor can be based on a magnitude of the updated cumulative delta value exceeding the upper delta threshold.

In other examples, updating the average cache hit rate includes updating, in response to the updated cumulative delta value being below the lower delta threshold, the average cache hit rate by decrementing the average cache hit rate using a decrement factor. In some examples, the decrement factor can be based on a magnitude of the updated cumulative delta value being below the lower delta threshold.

At step 412 one or more of the systems described herein reset the cumulative delta value in response to updating the average cache hit rate. For example, control circuit 112 can reset the cumulative delta value stored in register 116 in response to updating the average cache hit rate stored in register 118.

The systems described herein can perform step 412 in a variety of ways. In one example, resetting the cumulative delta value includes resetting the cumulative delta value using the updated average cache hit rate. In other examples, other values can be used for resetting the cumulative delta value.

At step 414 one or more of the systems described herein update a cache allocation policy for the cache based on the updated average cache hit rate. For example, control circuit 112 can update a cache allocation policy for cache 114 based on the updated average cache hit rate stored in register 118.

The systems described herein can perform step 414 in a variety of ways. In one example, control circuit 112 can compare the updated average cache hit rate with various cache hit rate thresholds corresponding to different cache allocation policies.

As detailed above, the systems and methods provided herein are directed to a technique for keeping an average rate in a register without keeping a history of rates. This technique involves having a current average and keeping a running count of a delta from the average. For each new rate, the delta is adjusted based on the difference between the latest rate and the average, either adding or subtracting. In other words, Delta=Delta+(New_Rate−Average). If the magnitude of the delta exceeds the average, then the average is adjusted. If the delta is positive and exceeds the average, the average can be subtracted from the delta and the average incremented (e.g., incrementing by delta/average, and to address cases where the average is small and the delta grows quickly, the delta can be delta % average). If the delta is negative, the average is subtracted by one and the delta is adjusted. In this way, if the new rates are consistently above the average, the average will increase, but if the new rates are consistently below the averaged, the average will decrease. More significant and consistent deviation from the average can produce faster adjustments to the average, whereas hovering close to the average can keep the average the same, or will require several iterations to update the average.

More specifically, for set sampling there is a need to detect continuous cache thrashing (misses) and automatically switch the cache allocation policy to not allocate. A running average can be tracked by keeping a large amount of hit rate history. The running average can stabilize when the hit rate is consistent and trend to zero when hit rate drops. The running average can also cover the cache warmup cycle in which it is desirable to allocate despite a period of misses. The running average can be able to cover the warmup cycle if it slowly descends to zero. Thrashing can correspond to be zero hits for a long duration of time such that the average will trend and stay zero in that case.

The running average cache hit rate technique described herein advantageously costs less area on chip, less power consumption, and considers a longer history as compared to tracking a history of cache hit rates. Similar performance using a FIFO queue of cache hit rates would require a very deep and wide structure, as well as a significant number of logic gates to sum up the entries. In contrast, the systems and methods described herein can be implemented using two counters (e.g., stored in two registers) and can provide more flexibility and configuration parameters to adjust settings per workload. For example, the configuration parameters allow modulating the average sample/response size, selecting between delta magnitude scaling or monotonic scaling, and adjusting allocation and/or no-allocation thresholds.

The average sample/response size corresponds to a number of responses to average based on the number of sets being observe in the sample set. In the front end, a tag lookup response hit counter can accumulates a fixed number of responses of which a corresponding subset can be used for calculating a new cache hit rate.

Delta scaling thresholds correspond to scale factors (e.g., +register/−register) for when the delta difference exceeds a threshold, leading to response curves that can more quickly respond when hit rates rapidly dips or spikes. Although monotonic scaling (+1/−1) can be a default, this scaling can generally be slow to respond to slope changes. However, monotonic scaling can track well given a large number of samples. For example, for an average of 64 responses, if the average is reset to full hit rate (64), it will take approximately 64 response accumulations of all misses (0) for the average to step down to 0 (e.g., 64*64=4096 miss responses).

The systems and methods provided herein can advantageously be implemented without requiring a data structure for actively tracking historical cache hit rate values, and further allows tracking a longer history. For instance, using a FIFO to track a similar number of cache hit values as capable with the systems and methods described above can require a deep and wide structure (e.g., for storing each value), as well as logic gates for summing up the entries. Instead, the systems and methods described herein can be implemented with two counters (e.g., cumulative delta value and average cache hit rate) with the further flexibility of configurable parameters (e.g., modulating the average sample size, delta magnitude scaling or monotonic scaling, allocation or no-allocation threshold, etc.). Advantageously, the systems and methods provided herein can be implemented with less area (e.g., requiring less components consuming space in an architecture) further providing reduces power consumption.

As detailed above, the circuits and systems described and/or illustrated herein broadly represent any type or form of computing device or system capable of executing computer-readable instructions. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   calculating a cache hit rate for a cache;
   determining a difference between the cache hit rate and an average cache hit rate for the cache that corresponds to an average of historical cache hit rates;
   updating a cumulative delta value by adding the difference to the cumulative delta value, wherein the cumulative delta value corresponds to an accumulation of delta values between successive cache hit rates and the average cache hit rate;
   determining that the updated cumulative delta value exceeds a delta range;
   updating, in response to determining that the updated cumulative delta value exceeds the delta range, the average cache hit rate;
   resetting the cumulative delta value in response to updating the average cache hit rate; and
   updating a cache allocation policy for the cache based on the updated average cache hit rate.

2. The method of claim 1, wherein:
   determining that the updated cumulative delta value exceeds the delta range includes determining that the updated cumulative delta value exceeds an upper delta threshold;
   updating the average cache hit rate includes updating, in response to the updated cumulative delta value exceeding the upper delta threshold, the average cache hit rate by incrementing the average cache hit rate using an increment factor that is based on a magnitude of the updated cumulative delta value exceeding the upper delta threshold;

determining that the updated cumulative delta value exceeds the delta range includes determining that the updated cumulative delta value exceeds the delta range by determining that the updated cumulative delta value is below a lower delta threshold;

updating the average cache hit rate includes updating, in response to the updated cumulative delta value being below the lower delta threshold, the average cache hit rate by decrementing the average cache hit rate using a decrement factor that is based on a magnitude of the updated cumulative delta value being below the lower delta threshold; and resetting the cumulative delta value includes resetting the cumulative delta value using the updated average cache hit rate.

3. A device comprising:
a first register configured to store a cumulative delta value, wherein the cumulative delta value corresponds to an accumulation of delta values between successive cache hit rates and an average cache hit rate that corresponds to an average of historical cache hit rates;
a second register configured to store the average cache hit rate; and
a control circuit configured to:
calculate a cache hit rate;
update the cumulative delta value based on the cache hit rate and the average cache hit rate;
update the average cache hit rate based on the updated cumulative delta value; and
update a cache allocation policy based on the updated average cache hit rate.

4. The device of claim 3, wherein the control circuit is configured to update the cumulative delta value by:
determining a difference between the cache hit rate and the average cache hit rate; and
adding the difference to the cumulative delta value.

5. The device of claim 3, wherein the control circuit is configured to update the average cache hit rate based on determining that the updated cumulative delta value exceeds a delta range.

6. The device of claim 5, wherein the control circuit is configured to determine that the updated cumulative delta value exceeds the delta range by determining that the updated cumulative delta value exceeds an upper delta threshold.

7. The device of claim 6, wherein the control circuit is configured to update the average cache hit rate by incrementing the average cache hit rate in response to the updated cumulative delta value exceeding the upper delta threshold.

8. The device of claim 7, wherein the control circuit is configured to increment the average cache hit rate using an increment factor.

9. The device of claim 8, wherein the increment factor is based on a magnitude of the updated cumulative delta value exceeding the upper delta threshold.

10. The device of claim 5, wherein the control circuit is configured to determine that the updated cumulative delta value exceeds the delta range by determining that the updated cumulative delta value is below a lower delta threshold.

11. The device of claim 10, wherein the control circuit is configured to update the average cache hit rate by decrementing the average cache hit rate in response to the updated cumulative delta value being below the lower delta threshold.

12. The device of claim 11, wherein the control circuit is configured to decrement the average cache hit rate using a decrement factor.

13. The device of claim 12, wherein the decrement factor is based on a magnitude of the updated cumulative delta value being below the lower delta threshold.

14. The device of claim 3, wherein the control circuit is further configured to reset the cumulative delta value in response to updating the average cache hit rate.

15. The device of claim 14, wherein the control circuit is configured to reset the cumulative delta value using the updated average cache hit rate.

16. A system comprising:
a physical memory;
at least one physical processor comprising a cache;
a first register configured to store a cumulative delta value, wherein the cumulative delta value corresponds to an accumulation of delta values between successive cache hit rates and an average cache hit rate that corresponds to an average of historical cache hit rates;
a second register configured to store the average cache hit rate for the cache; and
a control circuit configured to:
calculate a cache hit rate for the cache;
update, in the first register, the cumulative delta value based on the cache hit rate and the average cache hit rate;
determine that the updated cumulative delta value exceeds a delta range;
update, in response to determining that the updated cumulative delta value exceeds the delta range, the average cache hit rate in the second register; and
update a cache allocation policy for the cache based on the updated average cache hit rate.

17. The system of claim 16, wherein the control circuit is configured to update the cumulative delta value by:
determining a difference between the cache hit rate and the average cache hit rate; and
adding the difference to the cumulative delta value.

18. The system of claim 16, wherein:
the control circuit is configured to determine that the updated cumulative delta value exceeds the delta range by determining that the updated cumulative delta value exceeds an upper delta threshold; and
the control circuit is configured to update, in response to the updated cumulative delta value exceeding the upper delta threshold, the average cache hit rate by incrementing the average cache hit rate using an increment factor that is based on a magnitude of the updated cumulative delta value exceeding the upper delta threshold.

19. The system of claim 16, wherein:
the control circuit is configured to determine that the updated cumulative delta value exceeds the delta range by determining that the updated cumulative delta value is below a lower delta threshold; and
the control circuit is configured to update, in response to the updated cumulative delta value being below the lower delta threshold, the average cache hit rate by decrementing the average cache hit rate using a decrement factor that is based on a magnitude of the updated cumulative delta value being below the lower delta threshold.

20. The system of claim 16, wherein the control circuit is further configured to reset the cumulative delta value using the updated average cache hit rate.

* * * * *